United States Patent
Mannan et al.

(10) Patent No.: US 11,527,112 B2
(45) Date of Patent: Dec. 13, 2022

(54) VEHICLE ALLOCATION METHOD AND SYSTEM

(71) Applicant: ANI Technologies Private Limited, Karnataka (IN)

(72) Inventors: Azimul Mannan, Karnataka (IN); Moiaz Jiwani, Chattisgarh (IN)

(73) Assignee: ANI Technologies Private Limited, Bengaluru (IN)

( * ) Notice: Subject to any disclaimer, the term of this patent is extended or adjusted under 35 U.S.C. 154(b) by 520 days.

(21) Appl. No.: 15/958,882

(22) Filed: Apr. 20, 2018

(65) Prior Publication Data

US 2019/0251762 A1 Aug. 15, 2019

(30) Foreign Application Priority Data

Feb. 15, 2018 (IN) .............................. 201841005850

(51) Int. Cl.
*G07C 5/08* (2006.01)
*G08G 1/00* (2006.01)
*G06Q 30/04* (2012.01)
*G06Q 10/02* (2012.01)
*G07C 5/00* (2006.01)

(52) U.S. Cl.
CPC ........... *G07C 5/0808* (2013.01); *G06Q 10/02* (2013.01); *G06Q 30/04* (2013.01); *G07C 5/008* (2013.01); *G08G 1/202* (2013.01)

(58) Field of Classification Search
None
See application file for complete search history.

(56) References Cited

U.S. PATENT DOCUMENTS

| | | | |
|---|---|---|---|
| 8,731,768 B2 | 5/2014 | Fernandes et al. | |
| 8,930,231 B2 | 1/2015 | Bowne et al. | |
| 9,817,400 B1 | 11/2017 | Poeppel et al. | |
| 10,026,130 B1* | 7/2018 | Konrardy | G08G 1/096775 |
| 2014/0067491 A1* | 3/2014 | James | G06Q 50/30 705/13 |
| 2015/0206206 A1 | 7/2015 | Puente et al. | |
| 2015/0371153 A1* | 12/2015 | Lohmeier | G06Q 40/025 705/5 |
| 2017/0186054 A1* | 6/2017 | Fish | G06Q 50/30 |
| 2017/0186324 A1 | 6/2017 | Fish et al. | |
| 2018/0053423 A1* | 2/2018 | DaCosta | G06Q 30/0633 |
| 2019/0019122 A1* | 1/2019 | Allen | G06Q 10/063 |
| 2019/0019133 A1* | 1/2019 | Allen | G06Q 10/1053 |
| 2019/0049552 A1* | 2/2019 | Chu | G01S 5/0252 |

(Continued)

OTHER PUBLICATIONS

Griffin, Keith, "Buying a Used Car From a Private Seller," ThoughtCo., Jan. 19, 2018, pp. 1-4.

*Primary Examiner* — Peter D Nolan
*Assistant Examiner* — Michael F Whalen
(74) *Attorney, Agent, or Firm* — Chip Law Group (57) ABSTRACT

A vehicle allocation method and system are provided. Vehicle diagnostic data is received from vehicle-computing devices placed in vehicles. A diagnostic score is determined for each vehicle. A request for booking a ride is received from a customer device of a customer. A fare for the ride is determined for the vehicles. Options are transmitted to the customer device to select a vehicle for the ride based on the options. A customer selection is received from the customer device. A vehicle is allocated to the ride based on the customer selection.

18 Claims, 6 Drawing Sheets

(56) References Cited

U.S. PATENT DOCUMENTS

| | | | |
|---|---|---|---|
| 2019/0196503 A1* | 6/2019 | Abari | G06Q 10/00 |
| 2019/0359056 A1* | 11/2019 | Wilson | G16H 50/20 |
| 2020/0111169 A1* | 4/2020 | Halder | G06Q 40/08 |
| 2020/0156652 A1* | 5/2020 | Abundis Vargas | B60W 50/0098 |
| 2020/0265348 A1* | 8/2020 | Nimesh | G06Q 50/30 |

* cited by examiner

DEAR CUSTOMER, FOLLOWING ARE YOUR RIDE OPTIONS — 402

400

404a

RIDE FARE: $10

| VEHICLE TYPE: | SEDAN |
| VEHICLE NUMBER: | ABNN-XY-NNNN |
| RIDES TAKEN: | 4000 |
| VEHICLE HEALTH: | ★★★★★ |

LAST SERVICE DATE: 40 DAYS AGO

VEHICLE HEALTH SUMMARY:

| COMPONENT | ISSUE REPORTED |
|---|---|
| CLUTCH | YES |
| BRAKES | NO |
| ENGINE | NO |

406a

I ACCEPT — 408a

404b

RIDE FARE: $40

| VEHICLE TYPE: | HATCHBACK |
| VEHICLE NUMBER: | PQNN-AB-NNNN |
| RIDES TAKEN: | 100 |
| VEHICLE HEALTH: | ★★★★★ |

LAST SERVICE DATE: 8 DAYS AGO

VEHICLE HEALTH SUMMARY:

| COMPONENT | ISSUE REPORTED |
|---|---|
| CLUTCH | NO |
| BRAKES | NO |
| ENGINE | NO |

406b

I ACCEPT — 408b

VEHICLE ALLOCATION METHOD AND SYSTEM

CROSS-RELATED APPLICATIONS

This application claims priority of Indian Application Serial No. 201841005850, filed Feb. 15, 2018, the contents of which are incorporated herein by reference.

FIELD OF THE INVENTION

The present invention relates generally to transportation systems, and more particularly, to a method and a system for vehicle allocation.

BACKGROUND

Transportation service providers offer a variety of on-demand transportation services to customers, such as intra-city rides, inter-city rides, shared rides, vehicle rental services, and the like. A customer raises a request for a ride through a mobile application installed on a customer device, such as a smartphone, or through a website of a transportation service provider. The customer provides details of the ride such as a pick-up location, a destination location, and a time of travel. The transportation service provider computes a fare for the requested ride based on the pick-up and destination locations and provides the customer with an option to confirm a booking for the ride. If the booking is confirmed, the transportation service provider allocates a vehicle to the ride from a pool of available vehicles associated with the transportation service provider based on factors, such as availability of the vehicles and locations of the vehicles at the time of raising the requests.

At times, vehicles that have been used extensively or vehicles that are in a bad condition are allocated to riders based on their availability. In a scenario where a worn-out vehicle is allocated to a long-distance ride, such as an inter-city ride, the customer might face issues, such as vehicle breakdown and engine failure during the ride. Such issues lead to an unpleasant ride experience for the customers. Additionally, the safety of the customers may also be compromised. Presently, transportation service providers fail to predict and/or prevent such scenarios as vehicles are allocated to rides solely based on the abovementioned factors. Transportation service providers fail to take into consideration the condition of the vehicles before allocating the vehicle to rides.

Existing transportation service systems do not present the customers with data regarding the condition of the available vehicles. The customers are not aware whether the vehicle allocated to their ride is in a good or not. Thus, the customers do not have a flexibility to select vehicles for rides based on their condition. It is possible that certain customers, such as pregnant women or senior citizens prefer only those vehicles that are in good condition for travelling, while certain customers may agree to travel in a worn-out vehicle for short-distance rides such as intra-city rides. As the customers are not presented with data regarding the condition of the available vehicles, they cannot make a decision of selecting a vehicle from the available vehicles for the rides according to their preferences. Additionally, fares of rides are not calculated with consideration of the condition of the allocated vehicle. The fare of a ride is similar for vehicles in both good and bad conditions. Thus, customers that have to face discomfort while travelling in a vehicle that is in a bad condition have to pay a similar fare as customers that travel in vehicles that are in a good condition for similar rides. The transportation service providers do not offer different pricing options to a customer at the time of booking the ride based on the condition of the vehicles due to a lack of data regarding the condition of the available vehicles.

In light of the foregoing, there exists a need for a method and system for vehicle allocation that takes the condition of vehicles into consideration before allocating them to rides so that the customers have a pleasant travel experience. Further, the method and system should present data to the customer regarding the condition of vehicles and provide different pricing options for rides based on the condition of the vehicles.

SUMMARY

Various embodiments of the present invention provide a vehicle allocation method and a system therefor. The method includes one or more operations that are executed by circuitry of the system to allocate vehicles to rides. The circuitry receives diagnostic data from vehicle-computing devices of vehicles. The diagnostic data includes values of diagnostic parameters. The diagnostic data also includes diagnostic codes. The diagnostic parameters have priority levels associated with them. The diagnostic parameters include vehicle health parameters and fuel parameters. The circuitry determines diagnostic scores for the vehicles based on the values of the diagnostic parameters. The circuitry determines the diagnostic scores for the vehicles based on a weighted average of the values of the diagnostic parameters. The circuitry also updates the diagnostic scores of the vehicles at predefined time intervals. The circuitry further determines allocation pools for the vehicles based on allocation rules. Each allocation pool is associated with a service type from a plurality of service types.

The allocation rules indicate which vehicles are allocated to the allocation pools associated with the service types and an account type of the customer based on score ranges of the diagnostic scores. The allocation rules also indicate allocation of the vehicles based on values of specific parameters and diagnostic codes included in the diagnostic data of the vehicles. The allocation rules further indicate whether the vehicles are not to be allocated to any allocation pool based on the values of the parameters and their priority levels. The vehicles are also allocated to the rides based on a customer type of the customer along with the diagnostic scores or the diagnostic data of the vehicles.

The circuitry also receives a request for booking a ride from a customer device of a customer. The request includes a customer profile of the customer and a service type of the ride from the plurality of service types. The request also includes pick-up and destination locations of the customer. The circuitry determines a travel distance of the ride based on the request. The circuitry further determines a fare associated with the ride for the vehicles based on the request for the ride, the diagnostic scores of the vehicles, the customer profile of the customer, or the travel distance of the ride.

The circuitry then transmits options to the customer device to select one of the vehicles based on the diagnostic scores of the vehicles, the values of the diagnostic parameters, the service type, or the fare associated with the ride for the vehicles. The circuitry further receives a customer selection from the customer device based on the options transmitted by the circuitry. The circuitry allocates a vehicle to the ride based on the customer selection. The circuitry also transmits allocation notifications to the vehicle-computing device and the customer device.

The method and the system of the present invention provide options to the customer to select a vehicle for the ride. Thus, the customer can make an informed decision to select a vehicle for the ride. Further, the method and the system of the present invention take the diagnostic data of the vehicles into consideration to determine the fare for the ride.

BRIEF DESCRIPTION OF DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes a system for vehicle allocation. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
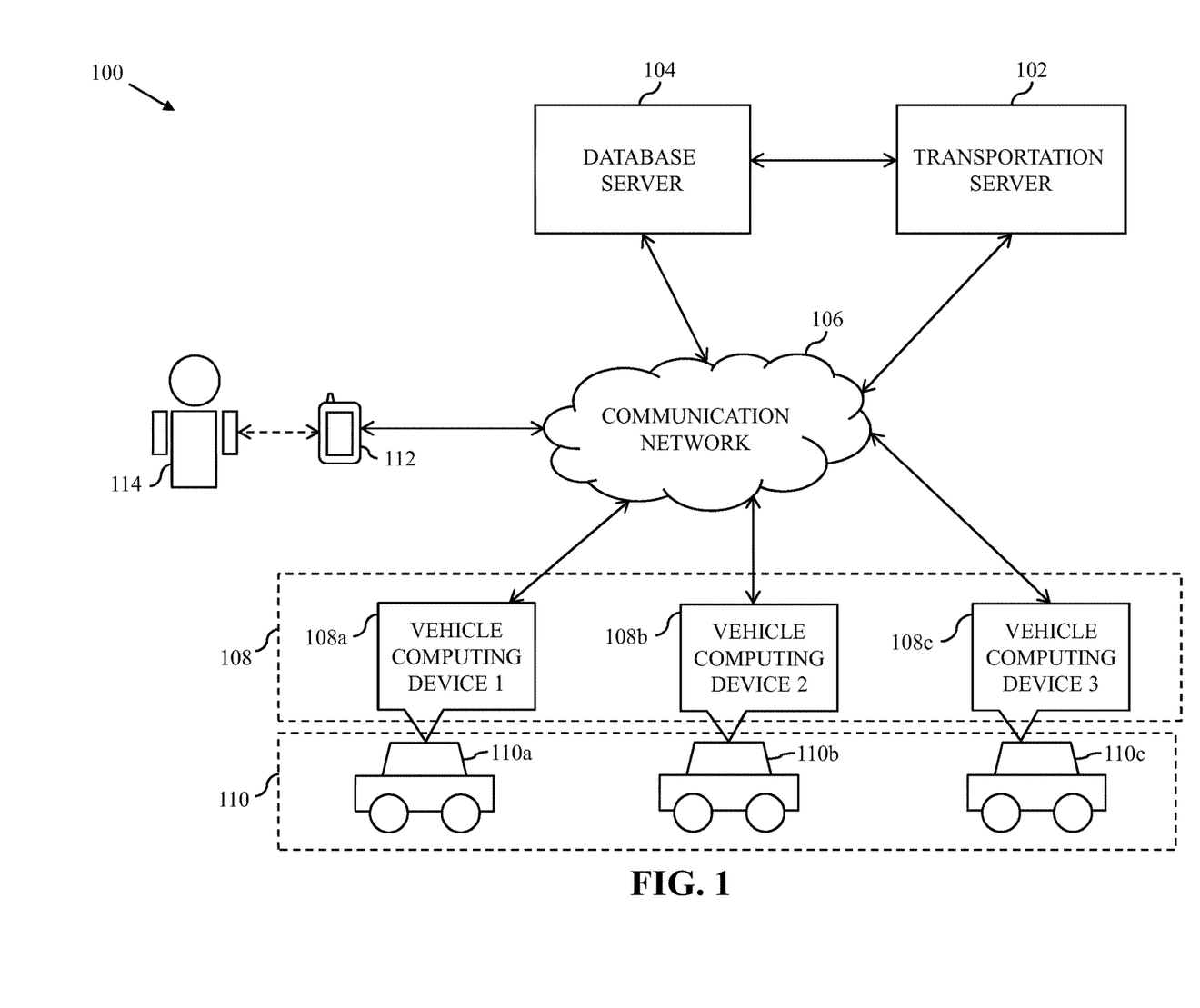
FIG. 1 is a block diagram that illustrates an environment for vehicle allocation, in accordance with an embodiment of the present invention.

Referring to FIG. 1, a block diagram that illustrates an environment 100 for vehicle allocation is shown, in accordance with an embodiment of the present invention. The environment 100 includes a transportation server 102 and a database server 104 associated with a transportation service provider (not shown). The database server 104 and the transportation server 102 communicate by way of a communication network 106. The environment 100 further includes a plurality of vehicle-computing devices 108 (hereinafter referred to as "vehicle-computing devices 108"). The vehicle-computing devices 108 include first through third vehicle-computing devices 108a-108c. The vehicle-computing devices 108 are associated with a plurality of vehicles 110 (hereinafter referred to as "vehicles 110"). For example, the first through third vehicle-computing devices 108a-108c are associated with first through third vehicles 110a-110c (i.e., the vehicles 110), respectively. The environment 100 also includes a customer device 112 associated with a customer 114. The environment 100 of FIG. 1 shows, for simplicity, one customer device, i.e., the customer device 112, and three vehicle-computing devices, such as the first through third vehicle-computing devices 108a-108c. However, it will be apparent to a person having ordinary skill in the art that the disclosed embodiments may be implemented for multiple customer computing devices and multiple vehicle-computing devices, without departing from the scope of the invention.

The transportation server 102 is an electronic device, a computing device, a software framework, or a combination thereof, hosting an application or a software service. The transportation server 102 is communicatively coupled to the communication network 106. In an embodiment, the operation of the transportation server 102 may be dedicated to execution of procedures, such as, but not limited to, programs, routines, or scripts stored in one or more memories for supporting its applied applications. The transportation server 102 receives vehicle diagnostic data (hereinafter referred to as "diagnostic data") from each of the vehicle-computing devices 108 at predefined time intervals. In one embodiment, the transportation server 102 transmits diagnostic data queries at predefined time intervals to each of the vehicle-computing devices 108 to retrieve the diagnostic data. The predefined time intervals are specified by the transportation service provider. The transportation server 102 also receives a request for booking a ride (hereinafter referred to as "ride request") from the customer device 112. The ride request is associated with a service type. In one example, the service type is one of an intra-city ride, an inter-city ride, a vehicle rental, and a shared-ride. The ride request also includes a time instance at which the request was raised. The ride request further includes the customer profile of the customer 114. The customer profile indicates information regarding the customer 114 such as name, age, gender, an account type, and a customer type of the customer. In one example, the customer type includes pregnant women, senior citizens, students and the like. In one example, the account type is one of a regular account and a premium account. The transportation server 102 further receives vehicle allocation rules (hereinafter referred to as "allocation rules") and ride pricing rules (hereinafter referred to as "pricing rules") from the database server 104, over the communication network 106. In one embodiment, the diagnostic data includes values of diagnostic parameters (hereinafter referred to as "parameters") measured by diagnostic systems (not shown) of the vehicles 110. The parameters include vehicle health parameters and fuel parameters.

The transportation server 102 determines condition of the vehicles 110 based on the vehicle health parameters. The transportation server 102 also determines whether the vehicles 110 require refilling of fuel. In an embodiment, the diagnostic data includes diagnostic codes. The diagnostic data also includes a unique vehicle identification number of the corresponding vehicle. In one scenario, the vehicle identification number is a vehicle registration or chassis number. The transportation server 102 determines diagnostic scores for each vehicle 110 based on the corresponding diagnostic data. In one embodiment, the diagnostic scores have numerical values between 1 and 10. The transportation server 102 allocates the vehicles 110 to allocation pools that are associated with the service types based on the allocation rules. The transportation server 102 further determines a set of available vehicles based on the allocation pools, the received ride request, and a customer profile of the customer 114. The set of available vehicles represents a subset of the vehicles 110 that are not allocated to any ride at a time instance at which the ride request was raised and that can be allocated to the ride. The transportation server 102 determines a fare for the ride for each of the set of available vehicles based on the diagnostic score of the corresponding vehicle, the received ride request, and the pricing rules, and transmits options to the customer device 112 to select a vehicle for the ride. In one embodiment, the options indicate the diagnostic scores, the determined fare for the ride and vehicle information of the set of available vehicles. The transportation server 102 allocates a vehicle from the set of available vehicles to the ride based on a customer selection received from the customer device 112. The transportation server 102 then transmits allocation notifications to the customer device 112 and the allocated vehicle. The transportation server 102 may be realized through various web-based technologies such as, but not limited to, a Java web-framework, a .NET framework, a PHP framework, or any other web-application framework. Examples of the transportation server 102 include, but are not limited to, a personal computer, a laptop, or a network of computer systems.

The database server 104 is a data management and storage server that is communicatively coupled to the communication network 106. The database server 104 performs one or more database operations, such as receiving, storing, processing, and transmitting queries, data, or content. The queries, data, or content is received/transmitted from/to various components of the environment 100. The database server 104 manages and stores the allocation rules and the pricing rules for the plurality of vehicles 110. In one embodiment, the database server 104 also stores the vehicle identification numbers associated with the vehicles 110. The database server 104 utilizes the vehicle identification numbers to identify each vehicle 110. The database server 104 also stores historical vehicle information (hereinafter referred to as "vehicle information") of the vehicles 110. In one example, the vehicle information includes a most recent service date and issues reported regarding components of the vehicles 110. In another example, the vehicle information includes a vehicle type and a number of rides taken by the vehicle. In an embodiment, the database server 104 receives a query from the transportation server 102 over the communication network 106, to retrieve the allocation or pricing rules and the vehicle information of each vehicle 110. The database server 104 also stores priority levels associated with the parameters. The database server 104, in response to the received query from the transportation server 102, transmits the requested information to the transportation server 102 over the communication network 106. Examples of the database server 104 include, but are not limited to, a personal computer, a laptop, or a network of computer systems.

It will be apparent to a person having ordinary skill in the art that the scope of the invention is not limited to realizing the transportation server 102 and the database server 104 as separate entities. In an embodiment, the functionalities of the database server 104 can be integrated into the transportation server 102, without departing from the spirit of the invention. Further, in an embodiment, the transportation server 102 may be realized as an application program installed on and/or running on the vehicle-computing devices 108 and/or the customer device 112, without departing from the spirit of the invention. The elements of the transportation server 102 and the database server 104 have been described in detail in conjunction with FIG. 3.

The communication network 106 is a medium through which content and messages are transmitted between various devices, such as the database server 104, the transportation server 102, the customer device 112, and the vehicle-computing devices 108. Examples of the communication network 106 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a mobile network such as cellular data network, high speed packet access (HSPA) network, or any combination thereof. Various devices in the environment 100 may connect to the communication network 106 in accordance with various wired and wireless communication protocols, such as Transmission Control Protocol and Internet Protocol (TCP/IP), User Datagram Protocol (UDP), 2nd Generation (2G), 3rd Generation (3G), and 4th Generation (4G) communication protocols, Long Term Evolution (LTE) communication protocols, or any combination thereof.

The customer device 112 is a computing device that is communicatively coupled to the communication network 106. In one embodiment, the customer device 112 may have a service application installed in it. The customer device 112 includes a display (not shown) capable of rendering one or more graphical user interfaces (GUIs) such as a booking interface (not shown) and a vehicle information interface (not shown). The customer 114 uses the service application to perform one or more activities. For example, the customer 114 uses the service application to raise the ride request for travelling between a pick-up location and a drop-off location by way of the booking interface. For raising the ride request, the customer 114 inputs details pertaining to the ride by way of the booking interface. The details include the pick-up location, the drop-off location, a time of travel, the service type and the like. In one scenario, the pick-up location may be the current location of the customer 114. In such a scenario, the customer device 112 tracks the current location of the customer 114 by way of a navigation system, such as a global positioning system (GPS) and automatically enters the pick-up location for the ride request. In another scenario, the pick-up location may not be the current location of the customer 114. In such a case, the customer 114 manually inputs the pick-up location by way of the booking interface. The customer device 112 transmits the ride request to the transportation server 102. The vehicle information interface presents the options to the customer 114 transmitted by the transportation server 102 regarding the set of available vehicles for the ride. Examples of the customer device 112 include, but are not limited to, a mobile phone, a smartphone, a personal digital assistant (PDA), a tablet, a phablet, a laptop, or any other portable communication device.

The vehicles 110 are means of transport that are deployed by the transportation service provider to provide transportation services to the customers 114. Examples of the vehicles 110 include an automobile, a car, a van, a truck, an autonomous vehicle, or the like. Each vehicle 110 may be associated with a driver (not shown). The customer 114 may travel in the vehicles 110 from the corresponding pick-up location to the drop-off location. Each vehicle 110 may include a driver device (not shown) that is communicatively coupled to the communication network 106. The driver devices receive the allocation notifications from the transportation server 102 and present information such as the pick-up locations of customers and navigation information to the associated driver. Each of the vehicles 110 also includes one or more vehicle diagnostic systems (not shown) such as an on-board diagnostic (OBD) system, a tire-pressure monitoring system (TPMS) and the like. The vehicle-computing devices 108 of each vehicle 110 transmit diagnostic data from the corresponding diagnostic systems to the transportation server 102. In one embodiment, the vehicle-computing devices 108 are computing devices included in the vehicle diagnostic systems, such as a data processing device of FIG. 2, that are communicatively coupled to the communication network 106. In another embodiment, the vehicle-computing devices 108 are one of vehicle head units of the corresponding vehicles or external communication devices, such as a mobile phone, a smartphone, a tablet, a phablet, or any other portable communication device, which are placed inside the corresponding vehicle, in communication with the vehicle diagnostic systems and the communication network 106. Operations of the vehicle diagnostic systems and vehicle-computing devices 108 have been described in detail in conjunction with FIG. 2.

In operation, each vehicle-computing device 108 transmits diagnostic data of the corresponding vehicle 110 to the transportation server 102 at the predefined time intervals. The transportation server 102 stores the received diagnostic data and calculates a diagnostic score for each vehicle 110 based on the received diagnostic data. The transportation server 102 requests the allocation rules from the database server 104 and determines the allocation pools for the vehicles 110 based on the diagnostic score of each vehicle and the received allocation rules. The customer 114 raises the ride request by way of the customer device 112. The customer device 112 transmits the ride request to the transportation server 102. The transportation server 102 determines a travel distance of the ride based on the pick-up and drop-off locations of the customer 114 and the service type of the ride included in the ride request. The transportation server 102 further determines the set of available vehicles from the vehicles 110 based on the customer profile and the allocation pools. For example, the set of available vehicles includes the first and second vehicles 110a and 110b. The transportation server 102 further determines a fare for the ride for each available vehicle based on the determined travel distance and the pricing rules. The transportation server 102 transmits the options to the customer device 112 to select a vehicle from the set of available vehicles for the ride based on the diagnostic scores, the determined fare for the ride and diagnostic information of the set of available vehicles from the vehicles 110. The customer device 112 presents the options to the customer 114 by way of the vehicle information interface. The customer 114 selects a vehicle for the ride based on the presented options and inputs a selection for a vehicle from the set of available vehicles for the ride by way of the vehicle information interface. For example, the customer 114 selects the first vehicle 110a for the ride. The transportation server 102 receives the customer selection for the ride and allocates the selected vehicle, i.e., first vehicle 110a to the ride. The transportation server 102 further transmits the allocation notifications to the customer device 112 and the allocated vehicle, i.e., to the first vehicle-computing device 108a.

Figure 2:
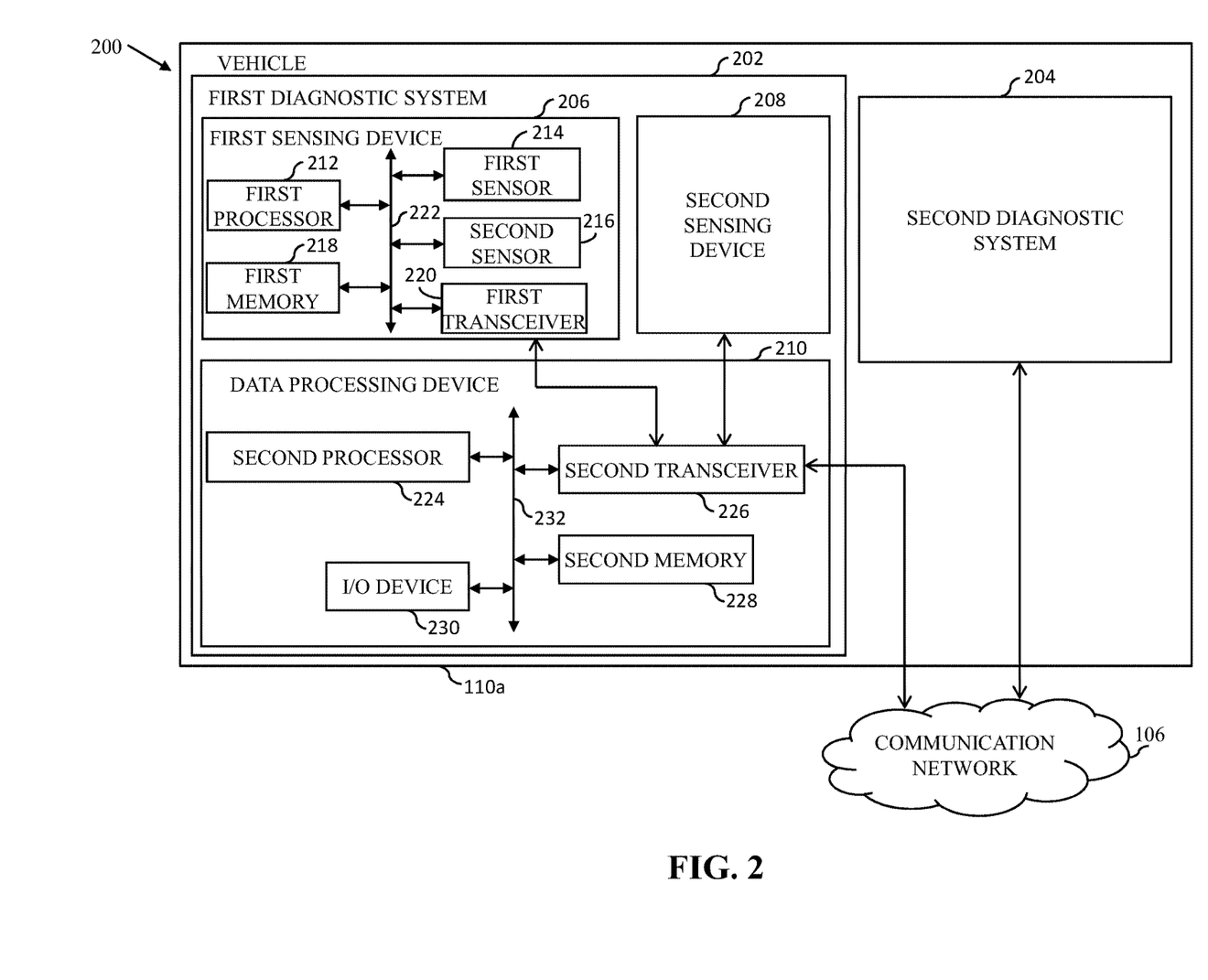
FIG. 2 is a block diagram that illustrates various components of a vehicle of FIG. 1, in accordance with an embodiment of the present invention.

Referring now to FIG. 2, a block diagram 200 that illustrates various components of a vehicle, such as the first vehicle 110a of the vehicles 110 is shown. The first vehicle 110a includes first and second diagnostic systems 202 and 204. The first and second diagnostic systems 202 and 204 are communicatively coupled to the communication network 106 and transmit diagnostic data to the transportation server 102 by way of the communication network 106. The first diagnostic system 202 includes first and second sensing devices 206 and 208, communicatively coupled to a data processing device 210. The first and second sensing devices 206 and 208 are associated with a corresponding component (not shown) of the first vehicle 110a such as a vehicle engine, a tire, and the like and transmit values of the vehicle health and fuel parameters corresponding to the associated components such as engine coolant temperature, tire pressure, engine RPM (rotations per minute), total distance traveled, and the like to the data processing device 210. The data processing device 210 receives the values of the parameters from the first and second sensing devices 206 and 208 and transmits the diagnostic data to the transportation server 102 by way of the communication network 106. In one embodiment, the data processing device 210 transmits the values of the parameters as part of the diagnostic data along with the vehicle identification number of the first vehicle 110a. For example, the diagnostic data includes values of first through fourth parameters, "engine temperature", "engine load", "fuel pressure", and "engine coolant temperature", respectively that correspond to vehicle health parameters. The diagnostic data also includes values of fifth and sixth parameters, "fuel level" and "fuel temperature" that correspond to fuel parameters. In another embodiment, the data processing device 210 transmits diagnostic codes such as Diagnostic Trouble Codes (DTC) that are based on the values of the parameters as part of the diagnostic data along with the vehicle identification number of the first vehicle 110a. In one embodiment, the transportation service provider specifies the priority levels associated with the parameters. For example, the transportation service provider specifies that the parameters associated with the component "brakes" have a high priority level and the parameters associated with the component "air conditioning system" have a low priority level.

The first sensing device 206 includes a first processor 212, first and second sensors 214 and 216, a first memory 218, and a first transceiver 220 that communicate with each other by way of a first communication infrastructure 222. The first processor 212 receives query messages from the data processing device 210 to retrieve the values of the parameters by way of the first transceiver 220. The first processor 212 also receives the values of the parameters from the first and second sensors 214 and 216 by way of the first communication infrastructure 222 and stores the values of the parameters in the first memory 218. The first processor 212 transmits the values of the parameters in response to the received query messages to the data processing device 210 by way of the first transceiver 220. The first and second sensors 214 and 216 measure the values of the parameters of the associated components in response to the query messages. In one example, the first sensing device 206 is associated with an engine (not shown) of the first vehicle 110a, the first sensor 214 measures oil level in the engine of the first vehicle 110a, and the second sensor 216 measures engine load of the engine of the first vehicle 110a. The second sensing device 208 is structurally and functionally similar to the first sensing device 206.

The data processing device 210 includes a second processor 224, a second transceiver 226, a second memory 228, and an I/O (Input/Output) device 230 that communicate with each other by way of a second communication infrastructure 232. In one embodiment, the second processor 224 transmits the query messages to the first and second sensing devices 206 and 208 at predefined time intervals and receives the values of the parameters from the first and second sensing devices 206 and 208 by way of the second transceiver 226. In another embodiment, the second processor 224 transmits the query messages to the first and second sensing devices 206 and 208 in response to diagnostic data queries received from the transportation server 102. In one embodiment, the second processor 224 transmits the values of the parameters as the diagnostic data to the transportation server 102 by way of the second transceiver 226. In another embodiment, the second processor 224 determines diagnostic codes, such as Diagnostic Trouble Codes (DTC), based on the values of the parameters and transmits the diagnostic codes as the diagnostic data to the transportation server 102. Each diagnostic code indicates a malfunction in the associated component of the vehicle. The I/O device 230 includes input and output devices (not shown) that are configured to operate under the control of the first processor 212. By means of the I/O device 230, the driver provides one or more inputs to perform the one or more operations. For example, the driver may provide one or more inputs to request the diagnostic data from the first diagnostic system 202 that is outputted by way of the output devices. Examples of the input devices may include a universal serial bus (USB) port, an Ethernet port, a real or virtual keyboard, a mouse, a joystick, a touch screen, a stylus, a microphone, and the like. Examples of the output devices may include a display, a speaker, headphones, a universal serial bus (USB) port, an Ethernet port, and the like.

It will be understood by a person skilled in the art that the number of diagnostic systems of the first vehicle 110a, such as the first and the second diagnostic systems 202 and 204 are not limited to two, as illustrated in FIG. 2. Further, each diagnostic system can include any number of sensing devices. Additionally, the first vehicle 110a may include a computing device (not shown) in communication with the diagnostic systems of the first vehicle 110a, such as the first and second diagnostic systems 202 and 204, that receives the diagnostic data from the corresponding diagnostic systems and transmits the diagnostic data to the transportation server 102.

Figure 3:
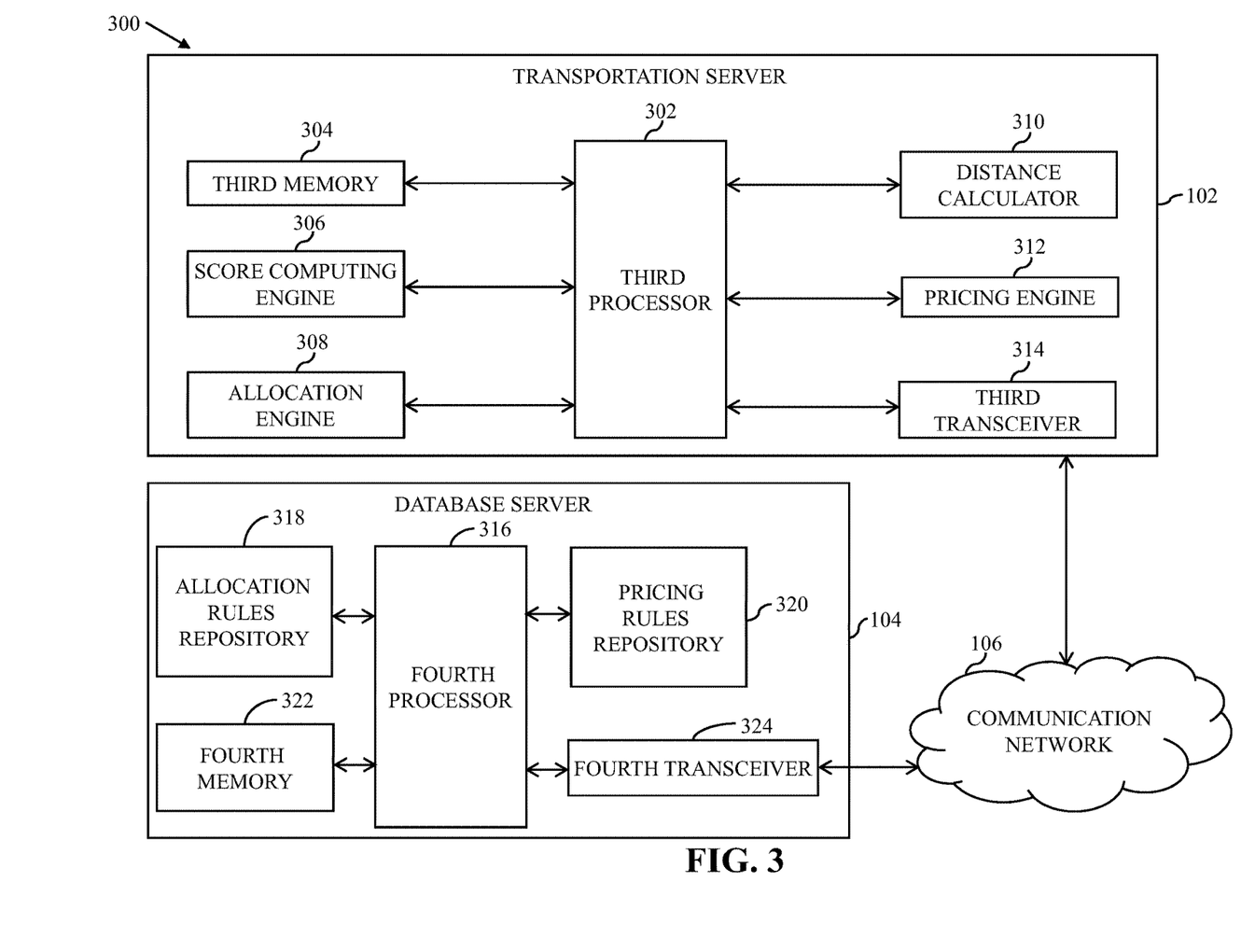
FIG. 3 is a block diagram that illustrates a transportation server and a database server of FIG. 1, in accordance with an embodiment of the present invention.

Referring now to FIG. 3, a block diagram 300 that illustrates the transportation server 102 and the database server 104 of the environment 100 is shown, in accordance with an embodiment of the present invention. The transportation server 102 includes a third processor 302, a third memory 304, a score computing engine 306, an allocation engine 308, a distance calculator 310, a pricing engine 312, and a third transceiver 314.

The third processor 302 includes suitable logic, circuitry, and/or interfaces that are operable to execute instructions, programs, codes, and/or scripts stored in the third memory 304 to perform one or more operations. For example, third processor 302 receives the diagnostic data from the vehicle-computing devices 108 and the ride request from the customer device 112. In one embodiment, the third processor 302 transmits diagnostic data queries to the vehicle-computing devices 108 at the predefined time intervals and receives the diagnostic data from the vehicle-computing devices 108 in response to the diagnostic data queries. The third processor 302 stores the diagnostic data in the third memory 304. The third processor 302 also transmits queries to the database server 104 to retrieve the unique identification numbers and vehicle information of the vehicles 110 and the allocation and pricing rules. The third processor 302 further determines the set of available vehicles from the vehicles 110 for the ride based on the allocation pools and the customer profile. The third processor 302 transmits the options to the customer device 112 for selecting a vehicle for the ride from the set of available vehicles. The third processor 302 receives the selection from the customer device 112 of a vehicle from the set of available vehicles and allocates the vehicle to the ride. Examples of the third processor 302 include, but are not limited to, an application-specific integrated circuit (ASIC) processor, a reduced instruction set computing (RISC) processor, a complex instruction set computing (CISC) processor, or a field-programmable gate array (FPGA). It will be apparent to a person skilled in the art that the third processor 302 is compatible with multiple operating systems.

The third memory 304 includes suitable logic, circuitry, and/or interfaces to store diagnostic data of the vehicles 110. The third memory 304 may also store one or more machine codes, or computer programs executable by the third processor 302. Examples of the third memory 304 include, but are not limited to, a random-access memory (RAM), a read-only memory (ROM), a programmable ROM (PROM), an erasable PROM (EPROM), a hard disk drive (HDD), and a secure digital (SD) card and the like.

The score computing engine 306 may comprise suitable logic, circuitry, interfaces, and/or code that may be operable to execute one or more sets of instructions, codes, scripts, and programs stored in the third memory 304. The score computing engine 306 determines the diagnostic scores for each vehicle 110 based on the diagnostic data received from the vehicle-computing devices 108. In one embodiment, the score computing engine 306 determines the diagnostic scores of the vehicles 110 by calculating a weighted average of the values of the parameters included in the diagnostic data of the vehicles 110. In one scenario, the diagnostic data includes values of first through fourth parameters. For example, the first through fourth parameters "engine temperature", "engine load", "fuel pressure", and "engine coolant temperature" have values P1, P2, P3, and P4, respectively, for the first vehicle 110*a*. The score computing engine 306 calculates the diagnostic score "D" for the first vehicle 110*a* as:

$$D = \frac{P1*n1 + P2*n2 + P3*n3 + P4*n4}{N} \quad (1)$$

where, n1, n2, n3 and n4 are predefined multiplication factors for the values of the first through fourth parameters, respectively; and N is a total number of parameters, for example 4.

In one embodiment, values of the predefined multiplication factors are specified by the transportation service provider based on the priority levels associated with the parameters. For example, if the priority level of the parameter "engine load" is higher than the priority level of the parameter "engine coolant temperature", the multiplication factor for the value of "engine load" will have a higher numerical value than the multiplication factor for the value of "engine coolant temperature". In one example, the score computing engine 306 determines diagnostic scores of 5, 8 and 2 for the first, second and third vehicles 110*a*, 110*b* and 110*c*, respectively. The score computing engine 306 may be realized by implementing one or more mathematical models, one or more statistical models, and/or one or more algorithms.

The allocation engine 308 includes suitable logic, circuitry, interfaces, and/or code that may be operable to execute one or more sets of instructions, codes, scripts, and programs stored in the third memory 304. The allocation engine 308 allocates each vehicle 110 to the allocation pools associated with the service types based on the allocation rules. An allocation pool typically includes one or more vehicles. Similarly, a single vehicle may be allocated to multiple allocation pools. For example, a first allocation pool is associated with intra-city rides, a second allocation pool is associated with inter-city rides, and a third allocation pool is associated with vehicle rentals, and so forth. In another scenario, each allocation pool is associated with an account type of the customer. For example, a fourth allocation pool is associated with a regular account type and a fifth allocation pool is associated with a premium account type. In one embodiment, the allocation rules indicate which allocation pool the vehicles 110 are allocated to, based on score ranges of their diagnostic scores. In one scenario, a first allocation rule indicates that the vehicles 110 are allocated to the first, second and third allocation pools if the diagnostic score of the vehicles lie within first, second and third score ranges, respectively. In one example, the first allocation rule indicates that a vehicle of the vehicles 110 is allocated to the first allocation pool associated with intra-city rides if the diagnostic score of the vehicle is within a score range of 3 to 7, the second allocation rule indicates that the vehicle is allocated to the second allocation pool associated with inter-city rides if the diagnostic score of the vehicle is within a second score range of 5 to 8 and the third allocation rule indicates that the vehicle is allocated to the third allocation pool associated with vehicle rentals if the diagnostic score of the vehicle is within a third score range of 9 to 10. In another example, a fourth allocation rule indicates that a vehicle is allocated to the fourth allocation pool associated with the regular account type if the diagnostic score of the vehicle is within a score range of 2 to 6, and a fifth allocation rule indicates that a vehicle is allocated to the fifth allocation pool associated with the premium account type if the diagnostic score of the vehicle is within a score range of 7 to 10. In yet another example, a sixth allocation rule indicates that vehicles having diagnostic scores below a predefined threshold, for example 2, are not allocated to any allocation pools and are dispatched to vehicle service centers for repair.

In another embodiment, the allocation rules indicate service areas in which the vehicles 110 are allowed to travel based on their diagnostic scores or values of parameters and the customer profile. In one scenario, the service areas indicate a maximum distance from a service center that the vehicles 110 are allowed to travel to. For example, a seventh allocation rule indicates that vehicles having diagnostic scores below 3 are allowed to travel to a maximum distance of 3 kilometers from a service center. In one example, the allocation engine 308 allocates the first vehicle 110*a* having a diagnostic score of 5 to the first allocation pool and the second vehicle 110*b* having a diagnostic score of 8 to the second allocation pool.

In yet another embodiment, the allocation rules indicate which allocation pools the vehicles 110 are allocated to, based on the values of specific parameters. In one scenario, an eighth allocation rule indicates that a vehicle of the vehicles 110 is allocated to the first allocation pool if the value of the parameter "engine coolant temperature" is below 50° C. In another scenario, the allocation rules indicate routes for the vehicles 110 based on the values of the fuel parameters, such that the vehicles having the values of the fuel parameters below a predefined threshold are allocated only to the rides that have routes along fuel refilling stations. In yet another scenario, the allocation rules indicate that certain vehicles of the vehicles 110 are not to be allocated to any allocation pools and sent to the vehicle service centers based on values of specific parameters. In one example, a ninth allocation rule indicates that vehicles having the value of the parameter "engine load" greater than 90% are not to be allocated to any allocation pools. In another example, a tenth allocation rule indicates that vehicles that do not have optimum values of the parameters having high priority levels are not to be allocated to any allocation pools.

In one scenario, the allocation rules indicate which vehicles are allocated to the rides based on the customer type and the diagnostic scores of the vehicles, the values of the parameters, or the diagnostic codes. In one example, an eleventh allocation rule indicates that vehicles having diagnostic scores within range of 3 to 6 are not allocated to pregnant women. In another example, a twelfth allocation rule indicates that vehicles having diagnostic data that includes specific diagnostic codes are not allocated to senior citizens. The allocation engine 308 may be realized by use of one or more mathematical models, one or more statistical models and/or one or more algorithms.

The distance calculator 310 may comprise suitable logic, circuitry, interfaces, and/or code that may be operable to execute one or more sets of instructions, codes, scripts, and programs stored in the third memory 304. The distance calculator 310 determines a travel distance of the ride based on the pick-up and destination locations of the customer included in the ride request. The distance calculator 310 may be realized by implementing one or more mathematical models, one or more statistical models and/or one or more algorithms.

The pricing engine 312 may comprise suitable logic, circuitry, interfaces, and/or code that may be operable to execute one or more sets of instructions, codes, scripts, and programs stored in the third memory 304. The pricing engine 312 determines the fare for the ride for each set of available vehicles. In one embodiment, the pricing engine 312 determines a standard fare for the ride based on the travel distance of the ride and the service type of the ride. The pricing engine 312 further determines the fare for the ride for each set of available vehicles based on the standard fare for the ride and the pricing rules. In one scenario, the pricing rules indicate discount factors for the standard fare for the ride based on the diagnostic scores of the vehicles 110. For example, a first pricing rule indicates a discount factor of 0.5 if the diagnostic score of a vehicle is within a score range of 3 to 6. In another scenario, the pricing rules indicate the discount factors for the standard fare for the ride based on values of certain parameters. For example, a second pricing rule indicates a discount factor of 0.4 if the value of the parameter "odometer reading" of a vehicle is greater than 50,000 km. In yet another scenario, the pricing rules indicate the discount factors for the standard fare for the ride based on the diagnostic codes included in the diagnostic data. The pricing engine 312 multiplies the standard fare for the ride with a discount factor for each of the set of available vehicles to determine the fare for the ride. For example, the standard fare for the ride is $20 and the discount factor for the first vehicle 110a is 0.5, then the pricing engine 312 multiplies the standard fare for the ride ($20) with the discount factor (0.5) and determines the fare for the ride for the first vehicle 110a to be $10. The pricing engine 312 may be realized by implementing one or more mathematical models, one or more statistical models and/or one or more algorithms.

Though the score computing engine 306, the allocation engine 308, the distance calculator 310, and the pricing engine 312 are depicted as separate entities in FIG. 3, a person skilled in the art will appreciate that they may be implemented within the third processor 302 without departing from the scope of the invention. Further, a person skilled in the art will appreciate that the third processor 302 may be configured to perform the functionalities of the score computing engine 306, the allocation engine 308, the distance calculator 310, and the pricing engine 312 without departing from the spirit of the invention.

The third transceiver 314 includes suitable logic, circuitry, and/or interfaces to transmit or receive messages from various devices, such as the database server 104, the vehicle-computing devices 108, and the customer device 112 over the communication network 106. Examples of the third transceiver 314 include, but are not limited to, an antenna, a radio frequency transceiver, a wireless transceiver, and the like. The third transceiver 314 communicates with the database server 104, the vehicle-computing devices 108, and the customer device 112, using various wired and wireless communication protocols, such as TCP/IP, UDP, 2nd Generation (2G), 3rd Generation (3G), 4th Generation (4G) communication protocols, or any combination thereof.

The database server 104 includes a fourth processor 316, an allocation rules repository 318, a pricing rules repository 320, a fourth memory 322 and a fourth transceiver 324. The fourth processor 316 includes suitable logic, circuitry, and/or interfaces that are operable to execute instructions, programs, codes, and/or scripts stored in the fourth memory 322 to perform one or more operations. For example, the fourth processor 316 receives the query message from the transportation server 102 to retrieve the allocation and pricing rules. The fourth processor 316 retrieves the allocation and pricing rules from the allocation rules repository 318 and the pricing rules repository 320, respectively and transmits the allocation and pricing rules by way of the fourth transceiver 324. Examples of the fourth processor 316 include, but are not limited to, an application-specific integrated circuit (ASIC) processor, a reduced instruction set computing (RISC) processor, a complex instruction set computing (CISC) processor, or a field-programmable gate array (FPGA). It will be apparent to a person skilled in the art that the fourth processor 316 is compatible with multiple operating systems.

The allocation rules repository 318 includes suitable logic, circuitry, and/or interfaces to store the allocation rules for the vehicles 110. Examples of the allocation rules repository 318 include, but are not limited to, a random-access memory (RAM), a read-only memory (ROM), a programmable ROM (PROM), an erasable PROM (EPROM), a hard disk drive (HDD), and a secure digital (SD) card and the like.

The pricing rules repository 320 includes suitable logic, circuitry, and/or interfaces to store the pricing rules for the vehicles 110. Examples of the pricing rules repository 320 include, but are not limited to, a random-access memory (RAM), a read-only memory (ROM), a programmable ROM (PROM), an erasable PROM (EPROM), a hard disk drive (HDD), and a secure digital (SD) card and the like.

The fourth memory 322 includes suitable logic, circuitry, and/or interfaces to store the unique identification numbers and the vehicle information of the vehicles 110. The fourth memory 322 may also store one or more machine codes, or computer programs executable by the fourth processor 316. Examples of the fourth memory 322 include, but are not limited to, a random-access memory (RAM), a read-only memory (ROM), a programmable ROM (PROM), an erasable PROM (EPROM), a hard disk drive (HDD), and a secure digital (SD) card and the like.

Figure 4:
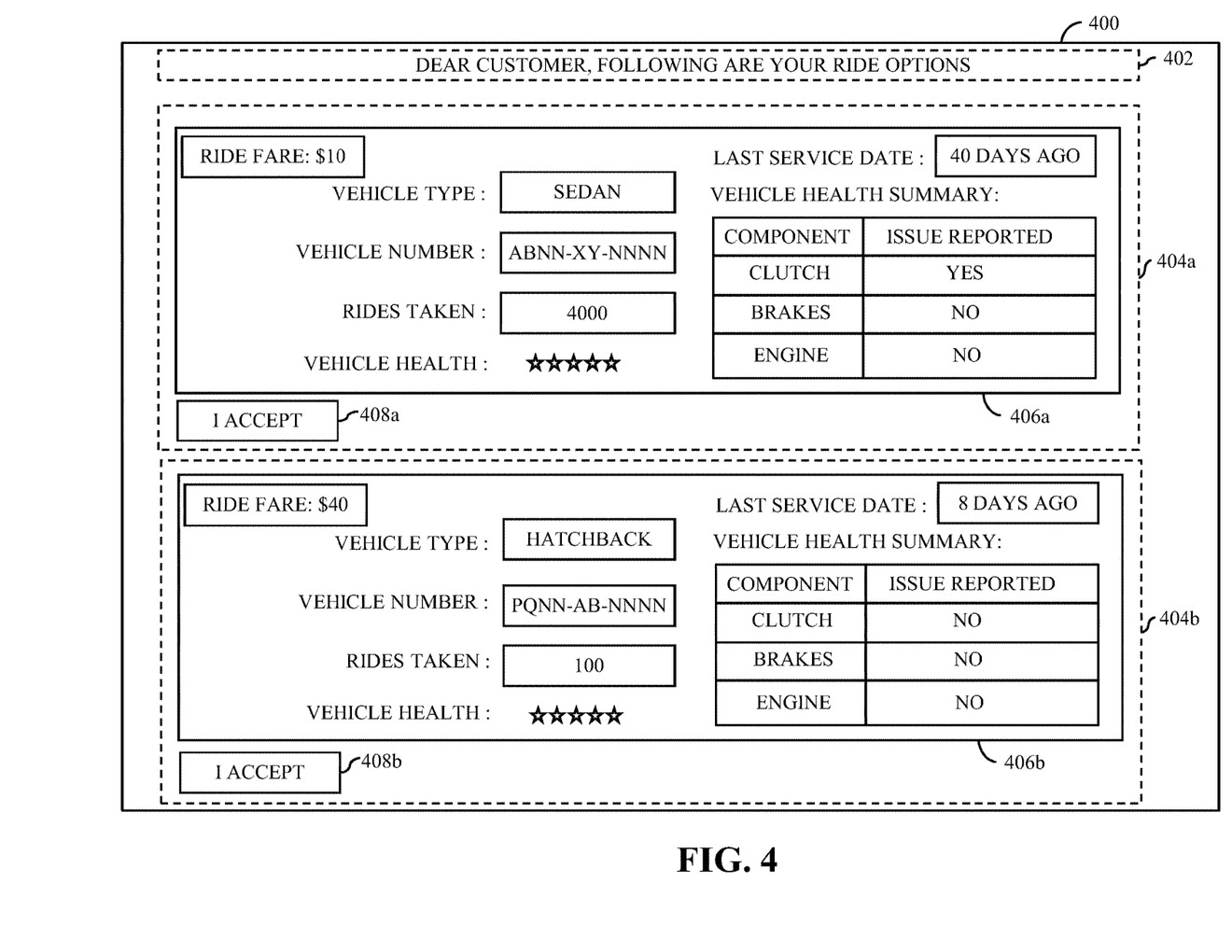
FIG. 4 is a block diagram that illustrates a vehicle information interface, in accordance with an embodiment of the present invention.

Referring now to FIG. 4, a block diagram that illustrates the vehicle information interface 400 is shown, in accordance with an embodiment of the present invention. In one embodiment, the vehicle information interface includes one or more sections, such as a customer message 402, a first vehicle option section 404a, and a second vehicle option section 404b. The first and second vehicle option sections 404a and 404b present the options transmitted by the transportation server 102 to the customer 114. In one example, the first and second vehicle option sections 404a and 404b present the options for the first and second vehicles 110a and 110b for the ride. The first and second vehicle option sections 404a and 404b include first and second vehicle information sections 406a and 406b and first and second 'accept' tabs 408a and 408b, respectively.

The first vehicle option section 404a includes information regarding a vehicle of the set of available vehicles, for example, the first vehicle 110a, such as the fare for the ride for that vehicle, the vehicle type, the vehicle number, the number of rides taken by the vehicle, the last service date, a vehicle health summary, and a vehicle health rating. The vehicle health rating indicates the diagnostic score of the vehicle and the vehicle health summary indicates whether issues were reported regarding components of the vehicle based on the vehicle information of the vehicle. For example, the vehicle health summary for the first vehicle 110a indicates whether issues were reported for the components "clutch", "brakes" and "engine". In another embodiment, the vehicle health summary indicates values of the parameters based on the diagnostic data of the vehicle. The customer 114 inputs the selection for a vehicle from the set of available vehicles i.e., the first and second vehicles 110a and 110b for the ride based on the information presented in the vehicle information sections 406a and 406b by way of the first and second 'accept' tabs 408a and 408b. For example, the customer 114 may select the first 'accept' tab 408a if the customer 114 wishes to travel by the first vehicle 110a for the ride. The customer device 112 transmits the customer selection to the transportation server 102. A person having ordinary skill in the art will understand that the vehicle information interface 400 may include multiple sections similar to the first and second option sections 404a and 404b corresponding to multiple available vehicles.

Figure 5:
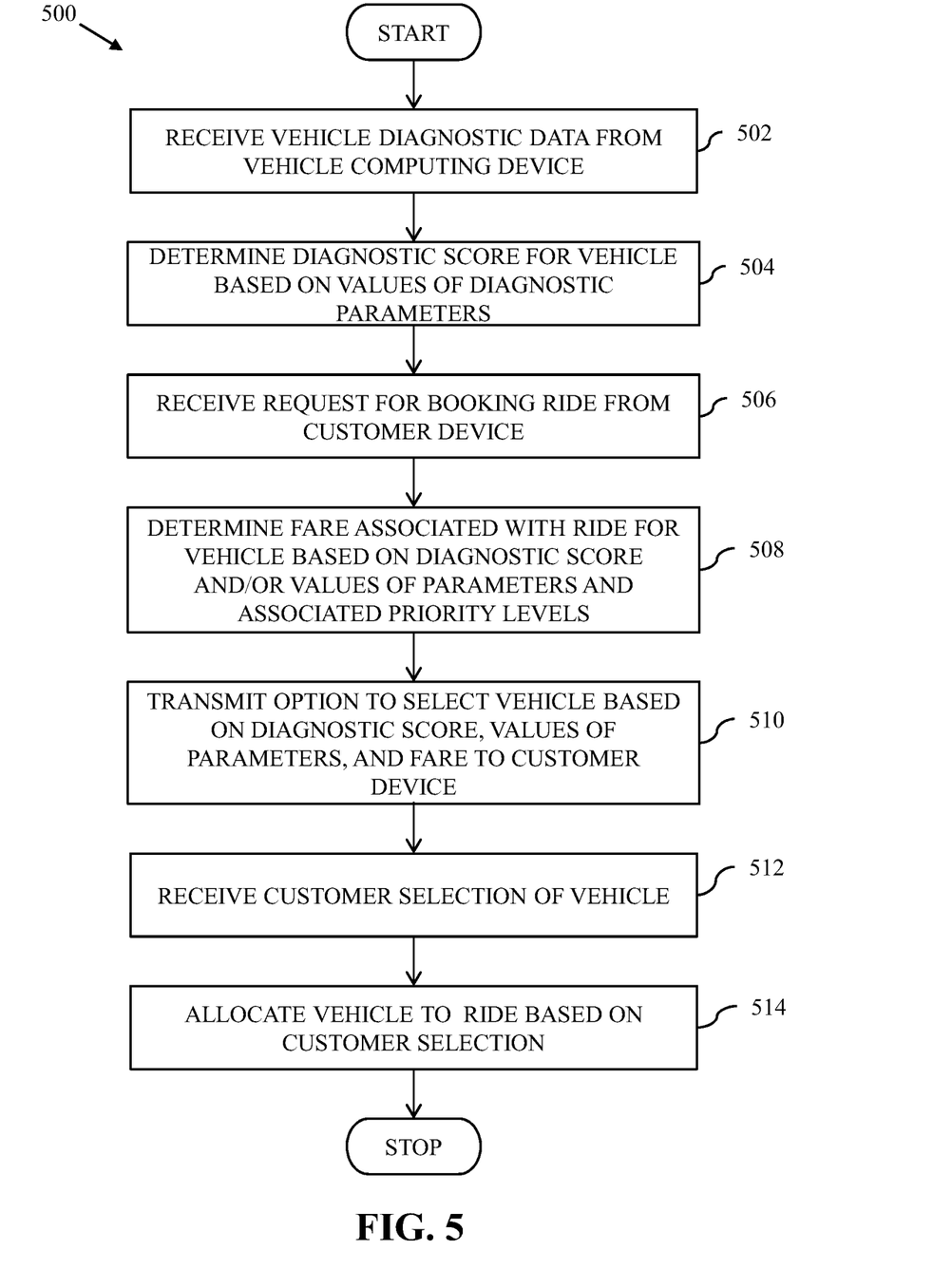
FIG. 5 is a flow chart that illustrates a method for vehicle allocation, in accordance with an embodiment of the present invention.

Referring now to FIG. 5, a flow chart 500 that illustrates a method for vehicle allocation is shown, in accordance with an embodiment of the present invention.

At step 502, the third processor 302 receives the diagnostic data from each vehicle-computing device 108, for example, of the first, second and third vehicles 110a, 110b, and 110c, by way of the third transceiver 314 and stores the diagnostic data in the third memory 304. The third processor 302 transmits queries to the database server 104 to retrieve the vehicle identification numbers and the vehicle information of the vehicles 110. At step 504, the score computing engine 306 determines diagnostic scores for each vehicle 110 based on the diagnostic data. For example, the score computing engine 306 determines diagnostic scores of 5, 8, and 2 for the first, second and third vehicles 110a, 110b, and 110c, respectively. The third processor 302 then transmits queries to the database server 104 to retrieve the allocation rules. The fourth processor 316 transmits the allocation rules from the allocation rules repository 318 to the transportation server 102 by way of the fourth transceiver 324. The allocation engine 308 then allocates each vehicle 110 to allocation pools based on the diagnostic data and diagnostic scores of the vehicles 110a and the allocation rules. In one example, the allocation engine 308 allocates the first and second vehicles 110a and 110b to the first allocation pool associated with intra-city rides, the second vehicle 110b to the second allocation pool associated with inter-city rides, and the third vehicle 110c to the third allocation pool associated with vehicle rentals.

At step 506, the third processor 302 receives the ride request from the customer device 112. The third processor 302 determines the account type, service type and time instance at which the ride request was raised from the customer device 112. For example, the third processor 302 determines that the account type is regular, the service type is intra-city ride, and the time instant when the ride request was raised is 9:00:00 AM. The third processor 302 determines the set of available vehicles from the vehicles 110. For example, the third processor 302 determines that the second allocation pool associated with intra-city service rides includes the first and second vehicles 110a and 110b and the third vehicle 110c is allocated to a ride at 9:00:00 AM. Thus, the set of available vehicles includes the first and second vehicles 110a and 110b. The distance calculator 310 determines the travel distance of the ride based on the pick-up and drop-off locations of the customer 114 included in the request.

At step 508, the pricing engine 312 determines the standard fare for the ride based on the determined distance. The third processor 302 transmits queries to the database server 104 to retrieve the pricing rules. The fourth processor 316 transmits the pricing rules from the pricing rules repository 320 to the transportation server 102 by way of the fourth transceiver 324. The pricing engine 312 determines the fare for the ride for each set of available vehicles, i.e., the first and second vehicles 110a and 110b based on the pricing rules. For example, the pricing engine 312 determines the fare for the ride as $10 for the first vehicle 110a and as $30 for the second vehicle 110b.

At step 510, the third processor 302 transmits the options to the customer device 112 for selecting a vehicle from the set of available vehicles, i.e., the first and second vehicles 110a and 110b based on the determined fare for the ride for the first and second vehicles 110a and 110b, and the diagnostic data of the first and second vehicles 110a and 110b. The customer device 112 presents the options to the customer 114 by way of the vehicle information interface of FIG. 4. In one scenario, the customer device 112 presents the diagnostic scores, the fare for the ride, and values of parameters, for the first and second vehicles 110a and 110b. The customer 114 inputs the selection of a vehicle for the ride based on the presented options, i.e., one of the first and second vehicles 110a and 110b for the ride. In one example, the customer 114 selects the first vehicle 110a for the ride. The customer device 112 transmits the customer selection to the transportation server 102 by way of the communication network 106. At step 512, the transportation server 102 receives the customer selection of one of the set of available vehicles, i.e., the first vehicle 110a for the ride.

At step 514, the transportation server 102 allocates the selected vehicle i.e., the first vehicle 110a to the ride. The transportation server 102 further transmits allocation notifications to the first vehicle 110a and the customer device 112 and the vehicle-computing device associated with the allocated vehicle i.e., the first vehicle-computing device 108a. The driver associated with the allocated vehicle then travels to the pick-up location of the customer 114 based on the allocation notification to pick-up the customer 114 for the ride.

Figure 6:
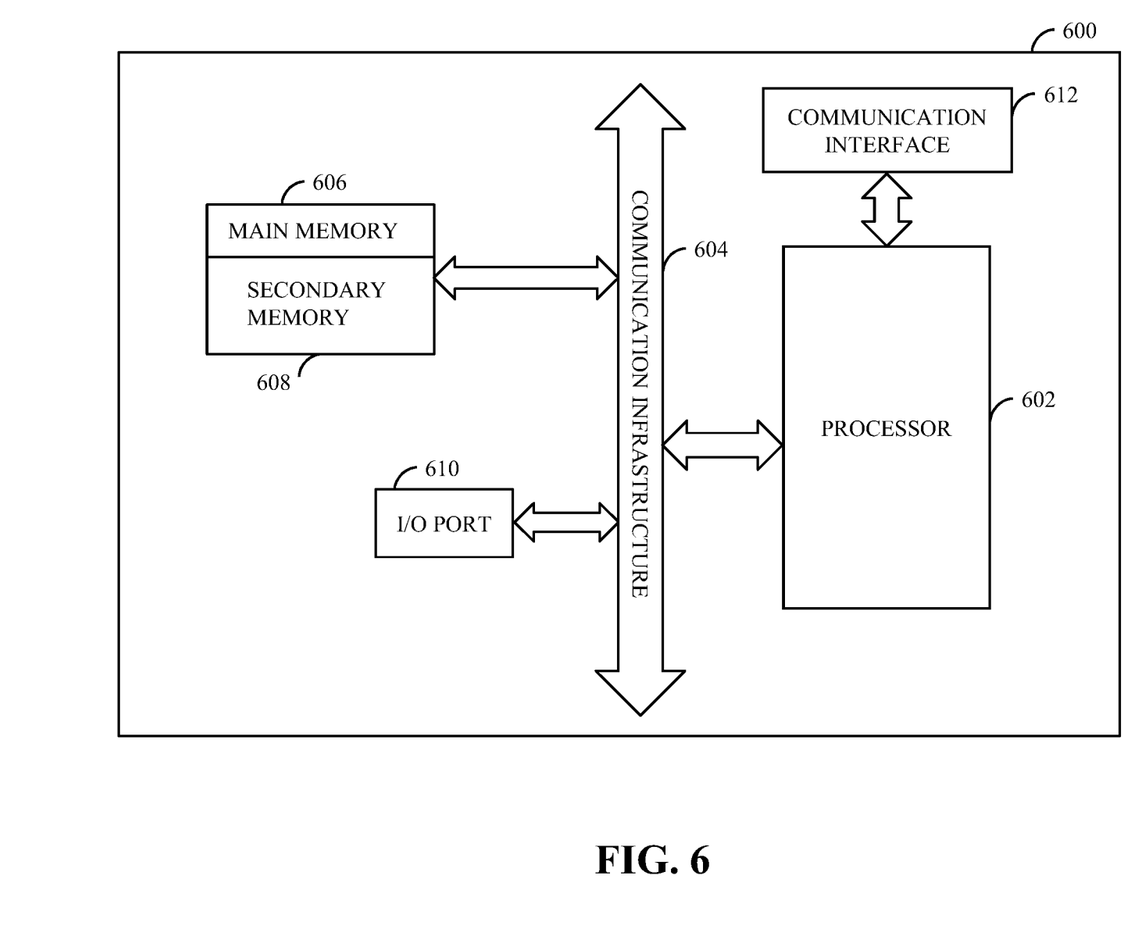
FIG. 6 is a block diagram that illustrates a computer system for vehicle allocation, in accordance with an embodiment of the present invention.

Referring now to FIG. 6, a block diagram that illustrates a computer system 600 for vehicle allocation is shown, in accordance with an embodiment of the present invention. An embodiment of the present invention, or portions thereof, may be implemented as computer readable code on the computer system 600. In one example, the transportation server 102 and the database server 104 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIG. 5.

The computer system 600 includes a processor 602 that may be a special purpose or a general-purpose processing device. The processor 602 may be a single processor, multiple processors, or combinations thereof. The processor 602 may have one or more processor "cores." Further, the processor 602 may be connected to a communication infrastructure 604, such as a bus, a bridge, a message queue, the communication network 106, multi-core message-passing scheme, and the like. The computer system 600 further includes a main memory 606 and a secondary memory 608. Examples of the main memory 606 may include random-access memory (RAM), read-only memory (ROM), and the like. The secondary memory 608 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 600 further includes an input/output (I/O) port 610 and a communication interface 612. The I/O port 610 includes various input and output devices that are configured to communicate with the processor 602. Examples of the input devices may include a keyboard, a mouse, a joystick, a touchscreen, a microphone, and the like. Examples of the output devices may include a display screen, a speaker, headphones, and the like. The communication interface 612 may be configured to allow data to be transferred between the computer system 600 and various devices that are communicatively coupled to the computer system 600. Examples of the communication interface 612 may include a modem, a network interface, i.e., an Ethernet card, a communications port, and the like. Data transferred via the communication interface 612 may be signals, such as electronic, electromagnetic, optical, or other signals as will be apparent to a person skilled in the art. The signals may travel via a communications channel, such as the communication network 106 which may be configured to transmit the signals to the various devices that are communicatively coupled to the computer system 600. Examples of the communication channel may include, but not limited to, cable, fiber optics, a phone line, a cellular phone link, a radio frequency link, a wireless link, and the like.

Computer program medium and computer usable medium may refer to memories, such as the main memory 606 and the secondary memory 608, which may be a semiconductor memory such as dynamic RAMs. These computer program mediums may provide data that enables the computer system 600 to implement the method illustrated in FIG. 5. In an embodiment, the present invention is implemented using a computer implemented application. The computer implemented application may be stored in a computer program product and loaded into the computer system 600 using the removable storage drive or the hard disc drive in the secondary memory 608, the I/O port 610, or the communication interface 612.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 602, and a memory, such as the main memory 606 and the secondary memory 608, implement the above described embodiments. Further, the operations may be described as a sequential process; however, some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

The diagnostic data transmitted by the vehicle-computing devices 108 allows the transportation service provider to keep track of the condition of the vehicles 110. Further, the allocation rules allow the transportation service provider to allocate vehicles to rides based on the service type and customer profiles. For example, the transportation service provider can choose to allocate only those vehicles that are in a good condition to inter-city rides or to the customers with premium accounts. The transportation service provider can also specify the allocation rules such that only vehicles having optimum values of the parameters are allocated to pregnant women or senior citizens to ensure safety during the rides. Thus, the transportation service provider can ensure a pleasant travel experience for long-distance rides such as inter-city rides or vehicle rentals. Also, by way of the fuel parameters, the vehicles that require refilling of fuel can be allocated to rides along the way to the fuel refilling stations. The pricing rules allow the transportation service provider to provide various pricing options to the customer 114 based on the diagnostic data of the vehicles 110. Further, the allocation and pricing rules can be changed according to the business requirements of the transportation service provider. By way of the vehicle information interface, the customer 114 is presented with information regarding the vehicles 110, including the diagnostic data and any reported issues with the vehicles 110. Thus, the customer 114 can make an informed decision to select one of the vehicles 110 for the ride based on his/her preferences. Further, the transportation service provider can offer attractive discounts for rides with vehicles having low diagnostic scores to price-conscious customers.

Techniques consistent with the present invention provide, among other features, system and method for vehicle allocation. Unless stated otherwise, terms such as "first" and "second" are used to arbitrarily distinguish between the elements such terms describe. Thus, these terms are not necessarily intended to indicate temporal or other prioritization of such elements.

While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

What is claimed is:

1. A method, comprising:
transmitting, by one or more processors, to a plurality of vehicle-computing devices of a plurality of vehicles, a plurality of queries at defined time intervals;
receiving, by the one or more processors, from the plurality of vehicle-computing devices via a communication network, vehicle diagnostic data of the plurality of vehicles at the defined time intervals in response to the transmitted plurality of queries, wherein the vehicle diagnostic data of each vehicle of the plurality of vehicles includes values of one or more diagnostic parameters sensed by one or more sensors of a corresponding vehicle at the defined time intervals;
determining and updating, by the one or more processors, a diagnostic score for each of the plurality of vehicles at the defined time intervals based on the values of the one or more diagnostic parameters of the corresponding vehicle;
retrieving, by the one or more processors from a database, a plurality of allocation rules for the plurality of vehicles, wherein a first allocation rule of the plurality of allocation rules is for allocation of a vehicle to at least one allocation pool of a plurality of allocation pools based on a diagnostic score of the vehicle, wherein a second allocation rule of the plurality of allocation rules indicates a maximum distance that a vehicle is allowed to travel from a vehicle service center based on a diagnostic score of the vehicle, wherein each allocation pool of the plurality of allocation pools is associated with a service type of a plurality of service types, and wherein the plurality of service types includes an intra-city ride, an inter-city ride, and a vehicle rental;

allocating, by the one or more processors, each vehicle of the plurality of vehicles to at least one allocation pool of the plurality of allocation pools based on the diagnostic score of the corresponding vehicle and the first allocation rule, wherein allocation of the plurality of vehicles to the plurality of allocation pools is updated based on the updated diagnostic score for each of the plurality of vehicles at the defined time intervals;

receiving, by the one or more processors, from a customer device of a customer via the communication network, a request for booking a ride, wherein the request includes a customer profile of the and a first service type of the plurality of service types;

determining, by the one or more processors, from the plurality of allocation pools, a first allocation pool that is associated with the first service type indicated by the received request;

determining, by the one or more processors, from the determined first allocation pool, a set of vehicles that is available to the customer for the ride, wherein the determination of the set of vehicles is based on the second allocation rule such that each vehicle in the determined set of vehicles will remain within the maximum distance of at least one vehicle service center throughout the ride;

determining, by the one or more processors, a fare for the ride for each vehicle of the set of vehicles based on the received request, the diagnostic score of the corresponding vehicle, and the customer profile of the customer;

transmitting, by the one or more processors, to the customer device via the communication network, an option to select a first vehicle from the set of vehicles for the ride based on the diagnostic score of each vehicle of the set of vehicles, the values of the one or more diagnostic parameters of each vehicle of the set of vehicles, and the fare for the ride for each vehicle of the set of vehicles;

receiving, by the one or more processors, from the customer device via the communication network, a customer selection for the ride based on the option to select the first vehicle for the ride; and allocating, by the one or more processors, the first vehicle of the set of vehicles to the ride based on the received customer selection.

2. The method of claim 1, wherein the vehicle diagnostic data of each vehicle of the plurality of vehicles further includes one or more diagnostic codes.

3. The method of claim 1, wherein the one or more diagnostic parameters comprise vehicle health parameters and fuel parameters.

4. The method of claim 1, wherein the received request further includes a pick-up location of the customer and a destination location of the customer, wherein the customer profile includes a customer type of the customer, and wherein the customer type includes a senior citizen, a student, or a pregnant women.

5. The method of claim 4, further comprising determining, by the one or more processors, a travel distance of the ride based on the received request.

6. The method of claim 5, wherein the determination of the fare for the ride for each vehicle of the set of vehicles is further based on the determined travel distance.

7. The method of claim 1, further comprising transmitting, by the one or more processors, allocation notifications to a first vehicle-computing device of the first vehicle and the customer device of the customer, based on the allocation of the first vehicle for the ride.

8. The method of claim 1, wherein the one or more diagnostic parameters are associated with one or more priority levels, respectively, and wherein the diagnostic score for each of the plurality of vehicles is further determined based on the one or more priority levels associated with the one or more diagnostic parameters of the corresponding vehicle.

9. The method of claim 1, wherein the plurality of allocation rules further includes a third allocation rule that indicates an allowed route for a vehicle based on a fuel parameter of the vehicle.

10. The method of claim 9, wherein the determination of the set of vehicles is further based on the third allocation rule such that a vehicle, in the first allocation pool, having a value of the fuel parameter below a predefined threshold is determined for the ride when a route associated with the ride has one or more fuel refilling stations therealong.

11. The method of claim 1, wherein the option transmitted to the customer device renders a vehicle information interface on a display of the customer device, wherein the vehicle information interface presents information regarding each vehicle of the determined set of vehicles, and wherein the presented information includes a number of rides taken in past by each vehicle of the set of vehicles, a last service date of each vehicle of the set of vehicles, and a vehicle health summary indicating one or more issues reported regarding one or more components of each vehicle of the set of vehicles.

12. A system, comprising:
a processor configured to:
transmit, to a plurality of vehicle-computing devices of a plurality of vehicles, a plurality of queries at defined time intervals;
receive, from the plurality of vehicle-computing devices via a communication network, vehicle diagnostic data of the plurality of vehicles at the defined time intervals in response to the transmitted plurality of queries, wherein the vehicle diagnostic data of each vehicle of the plurality of vehicles includes values of one or more diagnostic parameters sensed by one or more sensors of a corresponding vehicle at the defined time intervals;
determine and update a diagnostic score for each of the plurality of vehicles at the defined time intervals based on the values of the one or more diagnostic parameters of the corresponding vehicle;
retrieve, from a database, a plurality of allocation rules for the plurality of vehicles, wherein a first allocation rule of the plurality of allocation rules is for allocation of a vehicle to at least one allocation pool of a plurality of allocation pools based on a diagnostic score of the vehicle, wherein a second allocation rule of the plurality of allocation rules indicates a maximum distance that a vehicle is allowed to travel from a vehicle service center based on a diagnostic score of the vehicle, wherein each allocation pool of the plurality of allocation pools is associated with a service type of a plurality of service types, and wherein the plurality of service types includes an intra-city ride, an inter-city ride, and a vehicle rental;

allocate each vehicle of the plurality of vehicles to at least one allocation pool of the plurality of allocation pools based on the diagnostic score of each vehicle and the first allocation rule, wherein allocation of the plurality of vehicles to the plurality of allocation pools is updated based on the updated diagnostic score for each of the plurality of vehicles at the defined time intervals;

receive, from a customer device of a customer via the communication network, a request to book a ride, wherein the request includes a customer profile of the customer and a first service type of the plurality of service types;

determine, from the plurality of allocation pools, a first allocation pool that is associated with the first service type indicated by the received request;

determine, from the determined first allocation pool, a set of vehicles that is available to the customer for the ride, wherein the determination of the set of vehicles is based on the second allocation rule such that each vehicle in the determined set of vehicles will remain within the maximum distance of at least one vehicle service center throughout the ride;

determine a fare for the ride for each vehicle of the set of vehicles based on the received request, the diagnostic score of the corresponding vehicle, and the customer profile of the customer;

transmit, to the customer device via the communication network, an option to select a first vehicle of the set of vehicles for the ride based on the diagnostic score of each vehicle of the set of vehicles, the values of the one or more diagnostic parameters of each vehicle of the set of vehicles, or the fare for the ride for each vehicle of the set of vehicles;

receive, from the customer device via the communication network, a customer selection for the ride based on the option to select the first vehicle for the ride; and allocate the first vehicle of the set of vehicles to the ride based on the received customer selection.

13. The system of claim 12, wherein the vehicle diagnostic data of each vehicle of the plurality of vehicles further includes one or more diagnostic codes.

14. The system of claim 12, wherein the one or more diagnostic parameters comprise vehicle health parameters and fuel parameters.

15. The system of claim 12, wherein the received request further includes a pick-up location of the customer and a destination location of the customer, wherein the customer profile includes a customer type of the customer, and wherein the customer type includes a senior citizen, a student, or a pregnant women.

16. The system of claim 15, wherein the processor is further configured to determine a travel distance of the ride based on the received request.

17. The system of claim 16, wherein the fare for the ride for each vehicle of the set of vehicles is determined further based on the determined travel distance.

18. The system of claim 12, wherein the processor is further configured to transmit allocation notifications to a first vehicle-computing device of the first vehicle and the customer device of the customer, based on the allocation of the first vehicle for the ride.

* * * * *